H. J. FEINDT.
DIVIDER.
APPLICATION FILED JULY 6, 1921.
1,438,173.
Patented Dec. 12, 1922.
2 SHEETS—SHEET 2.
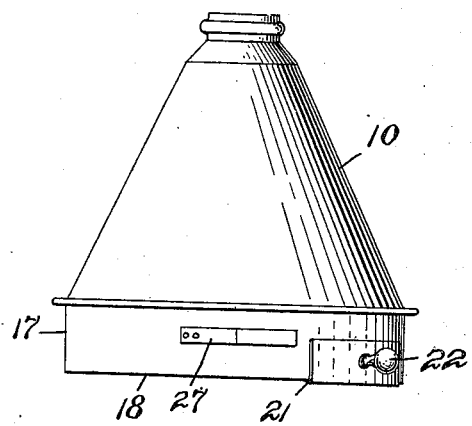
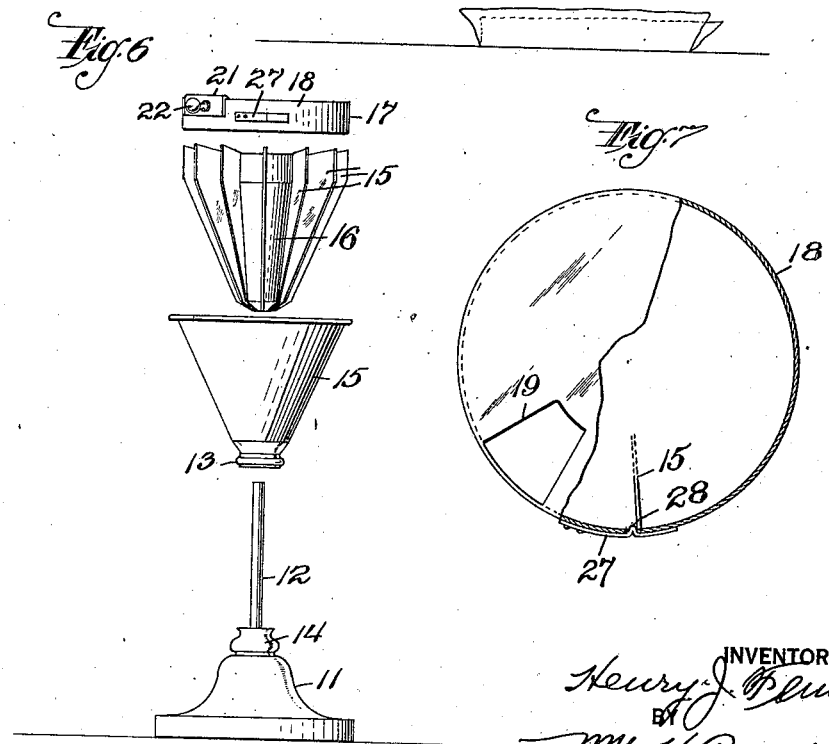
INVENTOR
Henry J. Feindt.
BY
Wm H Caufield
ATTORNEY Patented Dec. 12, 1922.

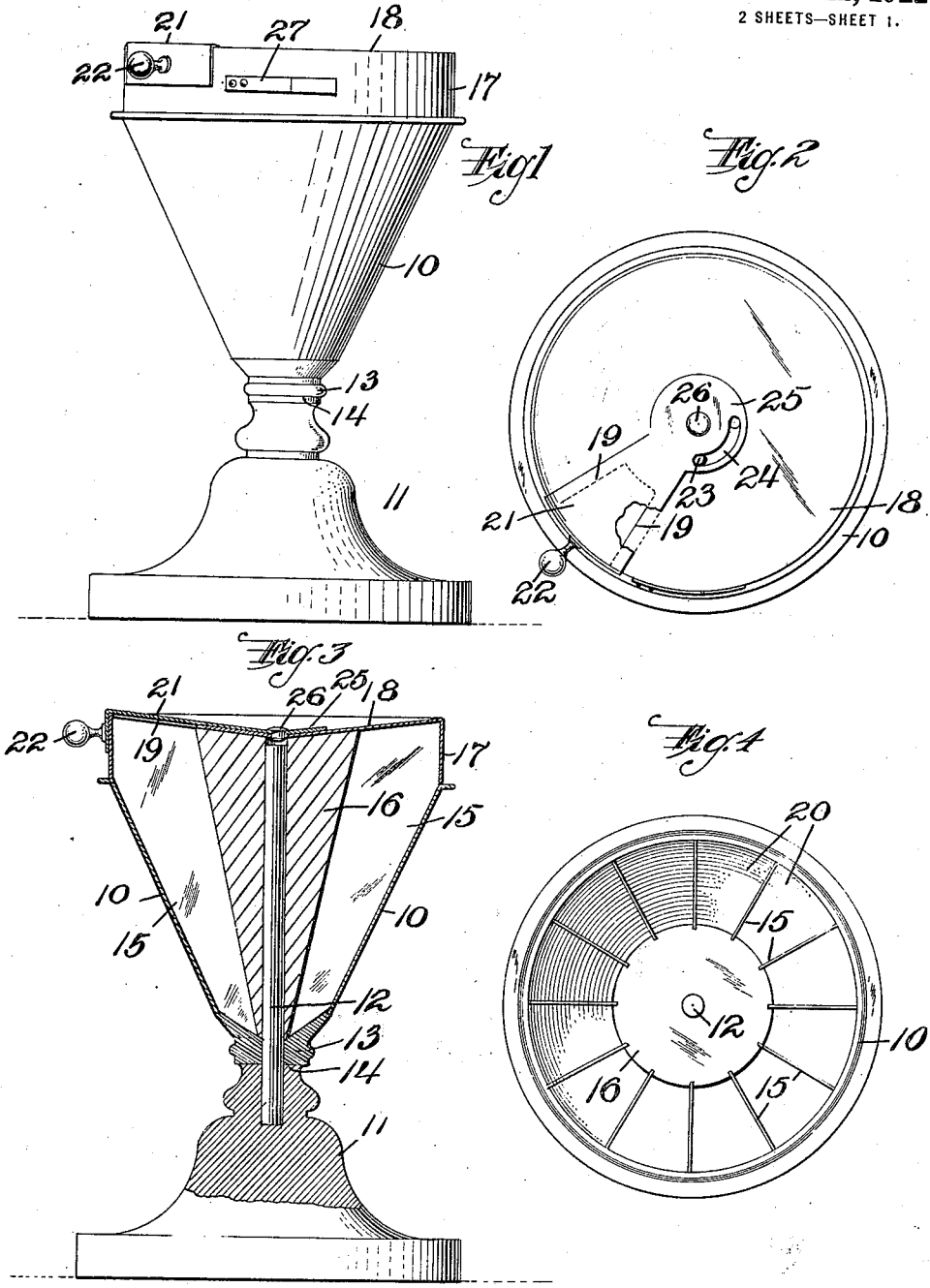

1,438,173

UNITED STATES PATENT OFFICE.

HENRY J. FEINDT, OF WEST ORANGE, NEW JERSEY.

DIVIDER.

Application filed July 6, 1921. Serial No. 482,663.

*To all whom it may concern:*

Be it known that I, HENRY J. FEINDT, a citizen of the United States, and a resident of West Orange, county of Essex, and State of New Jersey, have invented certain new and useful Improvements in Dividers, of which the following is a specification.

This invention relates to an improved divider which is particularly adapted for dividing a mass of material into a desired number of equal portions; for instance, in dividing a powdered substance into equal portions, as is often the case in pharmacies and laboratories.

The invention is designed to provide a divider of this kind that is substantial and can be easily operated and which is adapted for easy and quick cleaning.

The invention is illustrated in the accompanying drawings, in which Figure 1 is a side view of one form of device. Figure 2 is a top view thereof. Figure 3 is a central vertical section of Figure 1, and Figure 4 is a top view with the cover off. Figure 5 is a side view showing the position for dispensing the contents. Figure 6 is a perspective view showing the parts of the device shown in Figure 1 in separated relation, and Figure 7 is a detail view showing one form of yielding stop for the cover.

The device comprises a receptacle 10 which can be of any desired shape, but I show one that is tapered. Any desired means for supporting the receptacle can be used, but I illustrate a base 11 which is provided with a post 12, over which the receptacle can be seated, the bottom 13 of the receptacle resting on the top 14 of the base.

The dividing element that is placed into the receptacle can be provided in numbers for the same receptacle, as when it is directed by physicians, for instance, in a prescription that a certain amount of mixture in powdered form shall be made into four, six, eight, ten or twelve powders, and while an adjustable element can be devised, I prefer to make separate dividing elements to be easily placed in the receptacle according to the number of divisions desired of the quantity in the receptacle, and I show in the illustration a divider adapted to separate the contents into twelve parts, the dividing element in the form shown consisting of fins 15 which are suitably supported on a hub 16, which hub in the form shown is provided with a central perforation so that it is slid over the post 12, the outer edge of the fins being made so as to fit in the inside of the receptacle, and the hub being formed so as to fit the inside of the bottom of the receptacle, the fins being preferably arranged to project above the top of the receptacle for a slight distance so as to be enclosed by the flange 17 of the cover 18, the cover being formed to fit the outer side of the dividing element, the and top face of the dividing element, the cover having an opening 19 through which the contents of each of the compartments formed between the fins 15 can be successively dispensed.

The opening 19 in the cover is of the same general dimension and shape as each of the compartments 20 formed between the fins 15, and is preferably closed by a lid 21 which can be operated by a suitable handle 22 and is limited in its movement by reason of the pin 23 over which the slot 24 of the hub 25 of the lid 21 slides, the lid being pivoted at its center, as at 26, to the cover.

In order to indicate by touch when the opening 19 is over a compartment, I provide a yielding stop, the form shown consisting of a spring 27 which is fastened to the outside of the flange 17 of the cover and has a small teat 28 projecting through the cover and adapted to engage the outer edge of each fin in succession as the cover is rotated on the receptacle, so that a yielding means is provided for temporarily holding the cover against excess movement, but yielding to a positive turning by the hand.

The lid 21 can be used as a turning element by means of its handle 22 when the lid has been swung around to its open position, since the slot 24 is engaged on its back end by the fin and carries the cover with it when the handle 22 is pushed to carry the cover around to the next compartment.

When the device is to be used the receptacle is placed over the post 12 and the desired amount of substances is put in the receptacle, then the dividing element, in the form of the hub 16 and the fins 15, is placed down in the receptacle after the device has been shaken to level the ingredients or substance in the receptacle. This is easy on account of the tapered form of the dividing element and of the receptacle, and then the cover is put in place; then the cover and the receptacle are lifted off the post, the material being confined between the hub and the walls of the receptacle and the fins in the compartments 20. The device is turned upside down and the necessary amount of papers to hold the powders, or other receptacles in which the powders are to be placed, are arranged on the table, then the lid 21 is opened and the cover then carried around so as to successively open the compartments to permit the material to drop out, and when the last of the compartments is emptied the respective parts can be separated and each in itself can be easily and thoroughly cleaned.

When desired, the device is used as in Figure 5, but the receptacle 10 is removed and the dividing element is held in one hand and the cover is rotated in the other, and when thus used, which is the normal manner of use, when the receptacle 10 is not filled, before the dividers are inserted, the spring 17 can be eliminated because the set of compartments or bins formed by the fins 15 are in view, and the passage of the opening 19 from an empty compartment to the next filled one can be observed and the cover stopped at the right place.

It will be noted that the tapered outer face of the hub 16 is in register with the inner end of the opening 19, so that there is no projecting shoulder on which powdered substance can settle and the free passage of the powder through the opening 19 is assured, and the taper of the cover 18, when the device is upside down for dispensing, causes the powder to settle in the angle of the flange 17, the dished or sloping top surface of the cover 18 thus forming a hopper-like compartment between each of the adjacent fins 15.

It will be noted that the dividing element, with its fins 15, when reversed can be easily grasped by placing the fingers between some of the fins so that it is securely held against rotation and at the same time suspended, and with the other hand the reverse cover can be turned so that the opening 19 will successively come in register with the compartments.

I claim:

1. A divider comprising a tapered receptacle with an open top, a hub with radial fins shaped at their outer edges to fit the receptacle, the fins at their ends projecting above the receptacle, a cover resting on the receptacle and enclosing the projecting ends of the fins, the cover having an opening corresponding in size to the compartments formed by the fins, and means on the cover to yieldingly engage the edges of the fins to form a resilient stop when the opening and any one of the compartments are in register.

2. A divider comprising a base having a post thereon, a receptacle having its bottom perforated to receive the post, a hub fitting over the post, fins on the hub, said fins fitting the receptacle and projecting above it, a flanged cover to enclose the tops and projecting ends of the fins and resting on the receptacle, a spring detent on the cover to engage the fins, the cover having an opening to uncover the space between adjacent fins, and a lid for the opening.

3. A divider comprising a base having a post thereon, a receptacle having its bottom perforated to receive the post, a hub fitting over the post, fins on the hub, said fins fitting the receptacle and projecting above it, the fins and hub being inclined downward toward the center to form a concave top, a flanged cover with a concave top to enclose the tops and projecting ends of the fins and resting on the receptacle, a spring detent on the cover to engage the fins, the cover having an opening to uncover the space between adjacent fins, a lid for the opening, and a stop for the lid so that the lid when swung to its limit of opening acts as a rotating means for the cover.

In testimony that I claim the foregoing, I have hereto set my hand, this 1st day of July, 1921.

HENRY J. FEINDT.